United States Patent
Lee et al.

(10) Patent No.: US 12,478,347 B2
(45) Date of Patent: Nov. 25, 2025

(54) NON-METALLIC ULTRASOUND-DETECTABLE MARKERS

(71) Applicant: Mayo Foundation for Medical Education and Research, Rochester, MN (US)

(72) Inventors: Christine U. Lee, Byron, MN (US); James F. Greenleaf, Rochester, MN (US); James L. Herrick, Rochester, MN (US); Alan L. Miller, II, Rochester, MN (US); Michael J. Yaszemski, Rochester, MN (US); James W. Jakub, Rochester, MN (US); Matthew W. Urban, Rochester, MN (US); Benjamin G. Wood, Rochester, MN (US); Nathan J. Brinkman, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 251 days.

(21) Appl. No.: 17/762,018

(22) PCT Filed: Sep. 21, 2020

(86) PCT No.: PCT/US2020/051844
§ 371 (c)(1),
(2) Date: Mar. 18, 2022

(87) PCT Pub. No.: WO2021/055966
PCT Pub. Date: Mar. 25, 2021

(65) Prior Publication Data
US 2022/0362411 A1 Nov. 17, 2022

Related U.S. Application Data

(60) Provisional application No. 62/903,078, filed on Sep. 20, 2019.

(51) Int. Cl.
*A61B 8/08* (2006.01)
*A61B 8/00* (2006.01)
(Continued)

(52) U.S. Cl.
CPC .......... *A61B 8/0841* (2013.01); *A61B 8/4494* (2013.01); *A61B 8/46* (2013.01);
(Continued)

(58) Field of Classification Search
CPC ....... A61B 8/0841; A61B 8/4494; A61B 8/46; A61B 8/469; A61B 8/481; A61B 8/488;
(Continued)

(56) References Cited

U.S. PATENT DOCUMENTS 6,749,554 B1 * 6/2004 Snow .................. G21G 4/08
600/458
2014/0221820 A1 8/2014 McKinnis et al.
(Continued)

FOREIGN PATENT DOCUMENTS

WO 00/51136 A1 8/2000
WO 02/41786 A2 5/2002
(Continued)

OTHER PUBLICATIONS

Sun, Xiao et al., "Value of Color Doppler Twinkling Artifact and CT in Distinguishing Uric Stones from Cystine Stones: An Experimental Study", wprim.whocc.org.cn/admin/article/articleDetail?WPRIMID=475550&articleId=475550, printed Sep. 5, 2019, Abstract only.

*Primary Examiner* — Chao Sheng
(74) *Attorney, Agent, or Firm* — Quarles & Brady LLP (57) ABSTRACT

Markers (e.g., treatment site markers, biopsy site markers) are composed of a non-metallic material having a composition and/or other features or characteristics such that the markers will generate twinkling artifacts when imaged with ultrasound. In this way, the composition of the markers (Continued)

enables their detection and localization using ultrasound. The markers are generally composed of non-metallic materials that enhance the twinkling artifact.

20 Claims, 8 Drawing Sheets (51) Int. Cl.
*A61B 90/00* (2016.01)
*A61K 49/22* (2006.01)
*A61N 5/10* (2006.01)

(52) U.S. Cl.
CPC .............. *A61B 8/469* (2013.01); *A61B 8/481* (2013.01); *A61B 8/488* (2013.01); *A61B 8/5269* (2013.01); *A61B 90/39* (2016.02); *A61K 49/221* (2013.01); *A61K 49/223* (2013.01); *A61N 5/1007* (2013.01); *A61B 2090/3925* (2016.02)

(58) Field of Classification Search
CPC .................. A61B 8/5269; A61B 90/39; A61B 2090/3925; A61K 49/221; A61K 49/223; A61N 5/1007
See application file for complete search history.

(56) References Cited

U.S. PATENT DOCUMENTS

| | | |
|---|---|---|
| 2018/0280111 A1 | 10/2018 | Parish |
| 2018/0289444 A1 | 10/2018 | Blair et al. |
| 2019/0069803 A1 | 3/2019 | Bailey et al. |
| 2019/0298300 A1 | 10/2019 | Lu |
| 2021/0169579 A1* | 6/2021 | Laviola .................. A61B 8/463 |

FOREIGN PATENT DOCUMENTS

| | | |
|---|---|---|
| WO | 2014/081940 A1 | 5/2014 |
| WO | 2018/045222 A1 | 3/2018 |
| WO | 2019/118501 A2 | 6/2019 |

* cited by examiner

NON-METALLIC ULTRASOUND-DETECTABLE MARKERS

CROSS-REFERENCE TO RELATED APPLICATIONS

This application represents the national stage entry of PCT/US2020/051844 filed on Sep. 20, 2020 and claims the benefit of U.S. Provisional Patent Application Ser. No. 62/903,078, filed on Sep. 20, 2019, and entitled "NON-METALLIC ULTRASOUND-DETECTABLE MARKERS," the contents of which is herein incorporated by reference in its entirety.

BACKGROUND

Ultrasound ("US")-guided radioactive seed localization of a treated pathology-proven metastatic axillary lymph node is the standard of care in sentinel lymph node surgery in patients with locally advanced metastatic breast cancer. Unfortunately, preoperative US-guided localization of the positive axillary lymph node associated with a metallic identifier or biopsy marker or clip can often be suboptimal or unsuccessful. The reasons for these detection failures are observed to be multifactorial and include poor sonographic conspicuity of the marker, as well as extrusion of the marker from the metastatic lymph node, which normalizes in size and morphology during neoadjuvant chemotherapy.

Thus, because numerous currently available metallic biopsy markers are difficult to visualize by ultrasound, there is an unmet clinical need for radiologists to be able to detect treatment site or biopsy markers by ultrasound, even several months after marker placement.

Kidney stones generate a so-called "twinkling artifact" or "color comet-tail artifact" when imaged with ultrasound; although, there is yet to be a consensus on the mechanism for this artifact. In the case of kidney stones, this twinkling artifact, is visible on color Doppler ultrasound examinations as a rapid alternation of color immediately behind the stationary echogenic stones, representing a false appearance of movement. These twinkling artifacts may also manifest when power Doppler and spectral Doppler scans are performed, where the twinkling artifacts appear as a sign of heterogeneous spectral expansion composed of adjacent vertical lines with no waveform.

SUMMARY OF THE DISCLOSURE

The present disclosure addresses the aforementioned drawbacks by providing an ultrasound-detectable marker having a body that is composed of a non-metallic material and having formed therein a plurality of features that are sized and shaped that when imaged using Doppler ultrasound will generate a twinkling artifact.

It is another aspect of the present disclosure to provide a method for localizing an ultrasound-detectable marker. The method includes obtaining Doppler ultrasound data from a region-of-interest ("ROI") containing a marker that when insonated with ultrasound generates a twinkling artifact signature. A spatiotemporal variation of the twinkling artifact signature in the Doppler ultrasound data is computed, and the marker is localized in the ROI based on the spatiotemporal variation of the twinkling artifact signature.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are markers (e.g., treatment site markers, biopsy site markers, fiducial markers, localizers) that are composed of a non-metallic material having a composition and/or other features or characteristics such that the markers will generate twinkling artifacts when imaged with ultrasound. In this way, the composition of the markers enables their detection and localization using ultrasound. The markers are generally composed of non-metallic materials whose physical and/or chemical properties enhance the twinkling artifact, thereby resulting in a twinkling "signature" that can be readily detected with ultrasound imaging. Advantageously, the markers are composed of a material that will produce consistent and obvious "pointers" in an ultrasound image using the twinkling artifact phenomenon. As such, these twinkling artifacts delineate the position of a marker placed within a region-of-interest, such as a lymph node or breast lesion, prior to and/or after treatment, such as neoadjuvant treatment.

In some implementations, the ultrasound system being used can be configured to provide haptic and/or audio feedback for the user during a procedure. For instance, the ultrasound system can be configured to detect the twinkling artifact from an implanted marker and in response generate a haptic response, an audio feedback signal, or both.

It is another aspect of the present disclosure to provide markers that can be constructed with features that can be tuned to a specific frequency so that ultrasound can insonate specifically at that frequency allowing for reliable detection.

Figure 1:
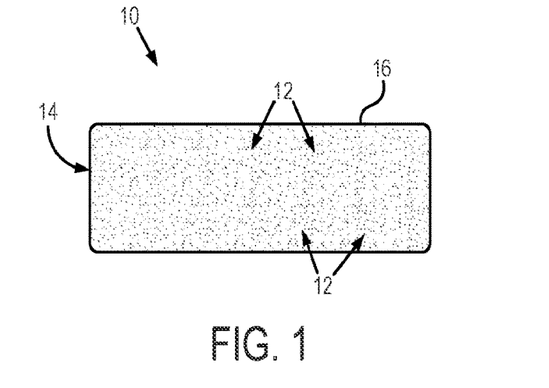
FIG. 1 show an example of a non-metallic ultrasound-detectable marker according to some embodiments described in the present disclosure.

Referring to FIG. 1, an example of a marker 10 that can be implemented in accordance with some embodiments of the present disclosure is illustrated. The marker 10 can have any suitable shape, including a generally cylindrical shape, a rectangular shape, a spherical shape, an ellipsoidal shape, a spiral shape, a coiled shape, a threaded shape, a helical shape, and so on. In other implementations, the marker 10 can be a clip or other instrument or device for implantation or insertion. For instance, the marker 10 can in some examples be a biopsy clip. In some implementations, the marker 10 can be sized to fit in standard needles for implantation, such as an 18-gauge needle. In other implementations, the marker 10 can be adhered, affixed, or otherwise coupled to a medical instrument or device to facilitate localization, guidance, and/or tracking of that medical instrument or device using ultrasound. In still other implementations, described in more detail below, the marker 10 can be a coating that is applied to another object, which may include a metallic marker.

Figure 2:
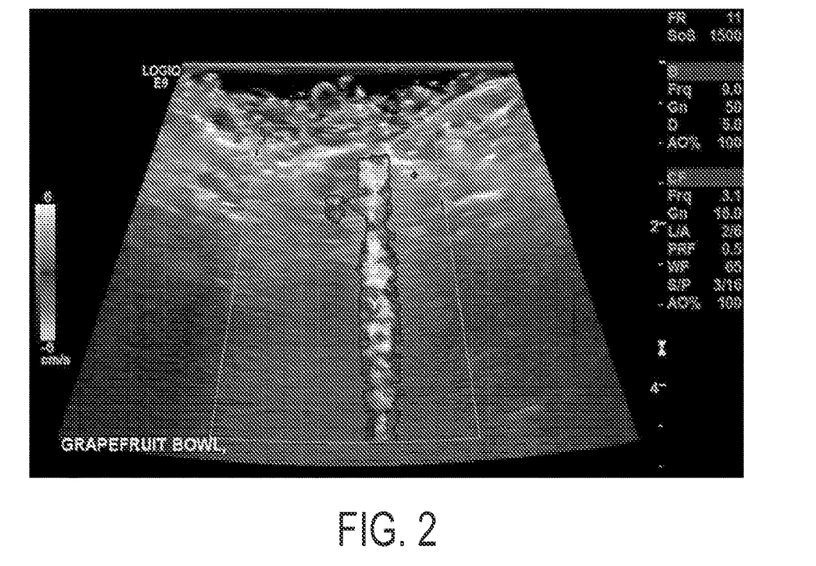
FIG. 2 is an example Doppler ultrasound image showing a twinkling signature generated by a marker constructed according to some embodiments described in the present disclosure.

In general, the marker 10 is composed of a suitable non-metallic material that will cause the marker 10 to generate a twinkling artifact when imaged using ultrasound, such as Doppler ultrasound, as shown in FIG. 2. For instance, the marker 10 can be composed of a non-metallic material having formed therein features 12 that are constructed to generate twinkling artifacts. As one example, the features can be air bubbles, or other gas-filled or fluid-filled bubbles. In general, the features 12 can be inherent physical and/or chemical characteristics of the material from which the marker 10 is composed. Additionally or alternatively, the features 12 can include fractures, cracks, pockets, pores, or other deformations, which may be filled with air or other gases or fluids. The features 12 can be formed entirely internal to the body 14 of the marker 10, or can be formed such that they extend to and at least partially break the outer surface 16 of the marker 10.

In some implementations, the features 12 are filled with a gas that is selected to be slowly diffusing from the marker 10 into the tissue. The gas can be trapped in the body 14 of the marker 10 using chemical engineering techniques, mechanical techniques, or the like. For instance, the features 12 can be mechanically formed in the body 14 of the marker 10, such as by applying a suitable stress, strain, pressure, or other mechanical force to the body 14 of the marker.

As described above, the marker 10 is composed of a non-metallic material into which features 12 such as bubbles, fractures, cracks, pockets, pores, or other deformations are formed. In general, non-metallic materials exclude those materials that are entirely or substantially composed of elemental metals or metal alloys. As described below, however, non-metallic materials can include trace or other small amounts of metal, such as when doping the non-metallic material with metal-based contrast agents (e.g., contrast agents containing metal salts, metal chelates, and the like). The material can be any suitable non-metallic and biocompatible material. Advantageously, the features 12 are physical and/or chemical characteristics of the body 14 itself (i.e., of the materials of which the body 14 is composed). In some implementations, the marker 10 can be composed of biodegradable materials, such that the marker 10 will naturally breakdown when inserted into a subject's tissue.

Figure 3:
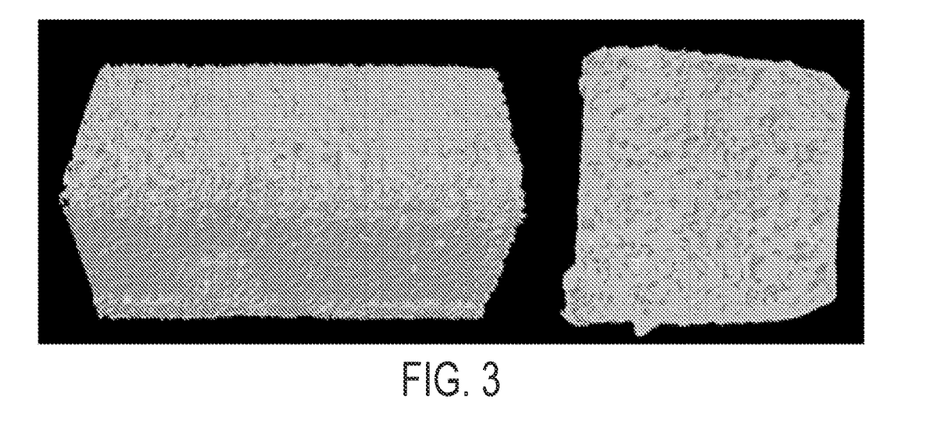
FIG. 3 shows micro-CT images of an example marker composed of PMMA and cut to size using a laser cutting technique.
Figure 4:
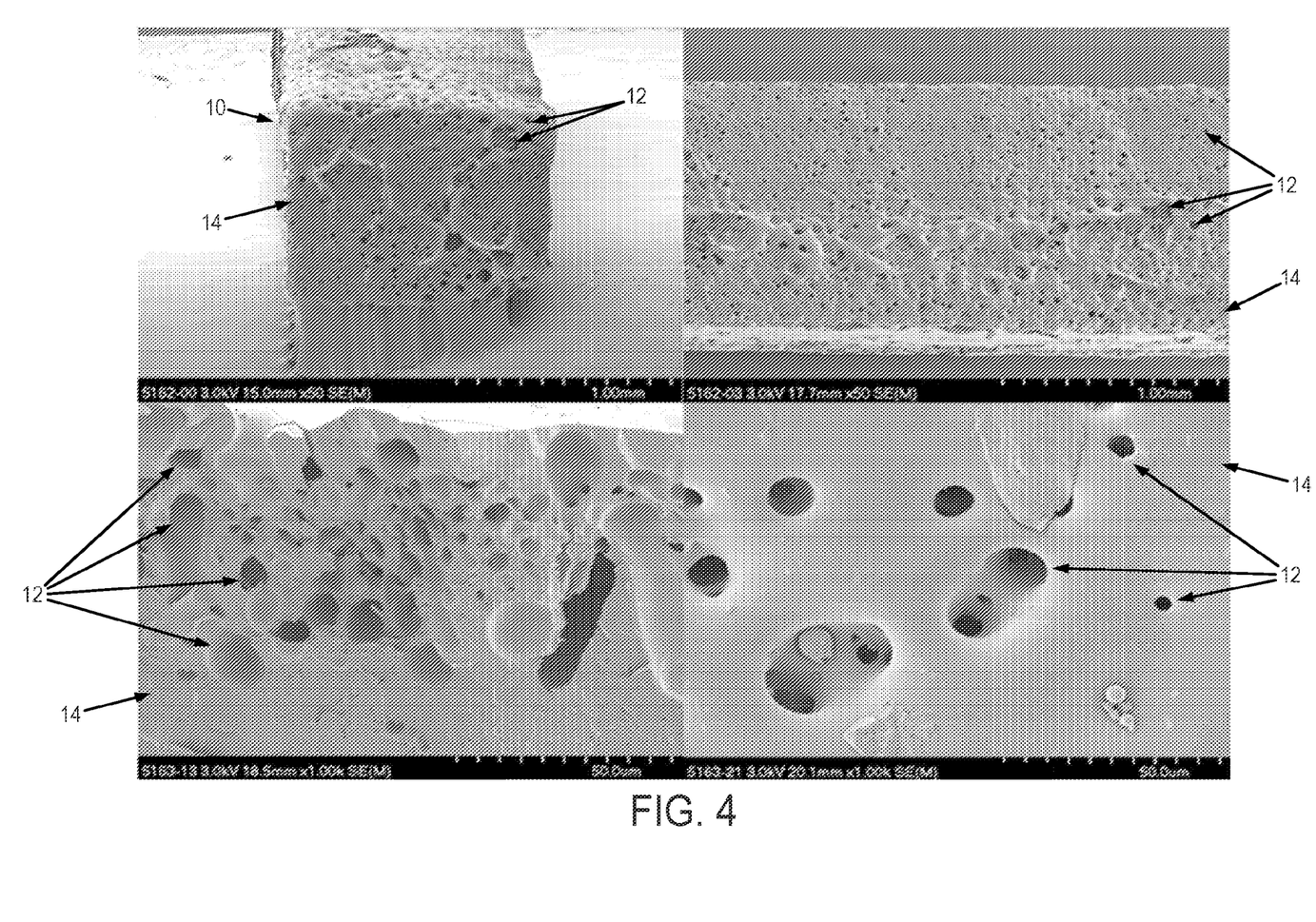
FIG. 4 shows scanning electron microscope images of the marker shown in FIG. 3.

As one example, the material can be a porous polymer, such as bone cement, or polymethyl methacrylate ("PMMA"). Advantageously, the pores in such a porous polymer can act as the features 12 that are constructed to generate twinkling artifacts. Markers 10 composed of PMMA or other porous polymers can be manufactured using laser cutting or other fabrication techniques to form the markers 10 from a substrate of porous polymer. An example of a marker 10 composed of a porous polymer is shown in FIG. 3. This marker 10 was made from a thin wafer of PMMA and cut to size using laser technology. The surface roughness and the internal pores can be seen on this micro-CT image performed at 5 micrometer resolution. FIG. 4 shows scanning electron microscope images of the marker shown in FIG. 3. The SEM images shows the presence of pores, fractures, and surface roughness in the marker. In some implementations, images of a porous polymer marker can be used to generate 3D printing instructions; that is, the images can be used as source data for a 3D printed marker.

As another example, the material can be artificial uric acid. As one non-limiting example, the marker 10 can be composed of artificial uric acid that has been prepared by compressing the artificial uric acid under pressure, such as a pressure between 150-450 MPa. As still another example, the marker 10 can be composed of a resin, such as a dental composite resin or other synthetic resin.

In some instances, the marker 10 can be manufactured using an additive manufacturing process, such as 3D printing, stereolithography (SLA), or the like. As one non-limiting example, the marker 10 can be manufactured using SLA or other 3D printing techniques in order to form the body 14 of the marker 10 as having a plurality of pores as the features 12 that are constructed to generate twinkling artifacts. The pores may be micrometer sized pores, millimeter sized pores, or combinations thereof. As one non-limiting example, the pores can be sized to have diameters between 0.5 mm and 1 mm, such as 0.5 mm, 0.6 mm, or 1 mm. In another non-limiting example, the pores can have diameters in the range of 1 µm to 500 µm, which in some instances may be in the range of 1 µm to 80 µm. The pores may be uniform in size, or may have different sizes throughout the body 14 of the marker 10.

Figure 5:
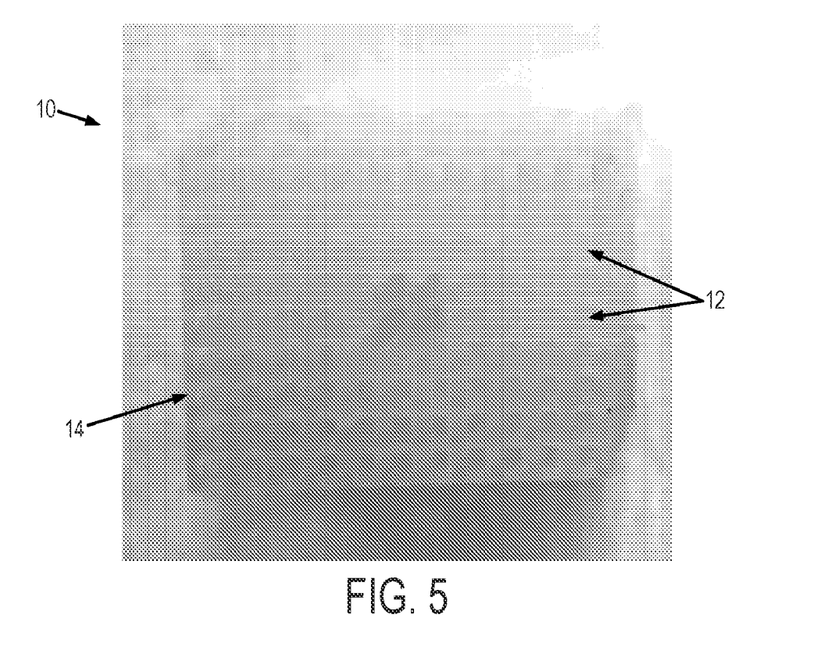
FIG. 5 shows an example marker composed as a three-dimensional lattice of non-metallic material.
Figure 6:
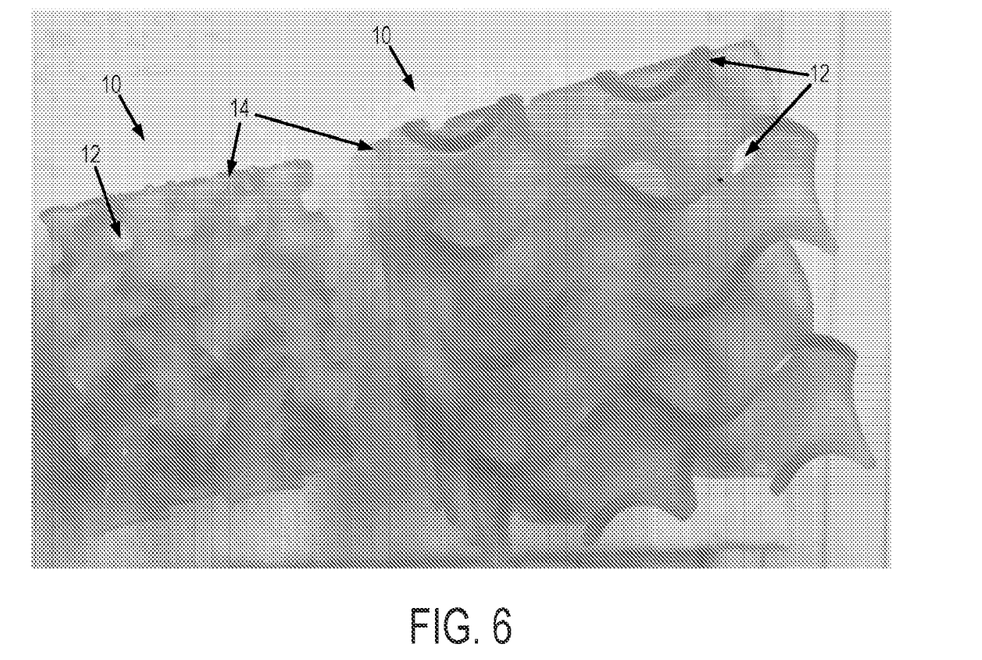
FIG. 6 shows examples of markers constructed to have wave-like protrusions.

As another non-limiting example, the marker 10 can be manufactured using SLA or other 3D printing techniques in order to form the body 14 of the marker 10 as having a plurality of extruded and/or protruded surface features as the features 12 that are constructed to generate twinkling artifacts. For example, the body 14 can be constructed to have protrusions on the outer surface 16 of the body 14, such as wave-like protrusion; straight-line extrusions, which may form a grid or otherwise intersect with each other; or the like. In the example shown in FIG. 5, the marker 10 is constructed as a three-dimensional gridded structure, such as a grid lattice structure. In the examples shown in FIG. 6, the markers 10 are constructed to have wave-like protrusions on the outer surface. As shown, the markers 10 may also include apertures or other openings in the body 14.

Figure 7:
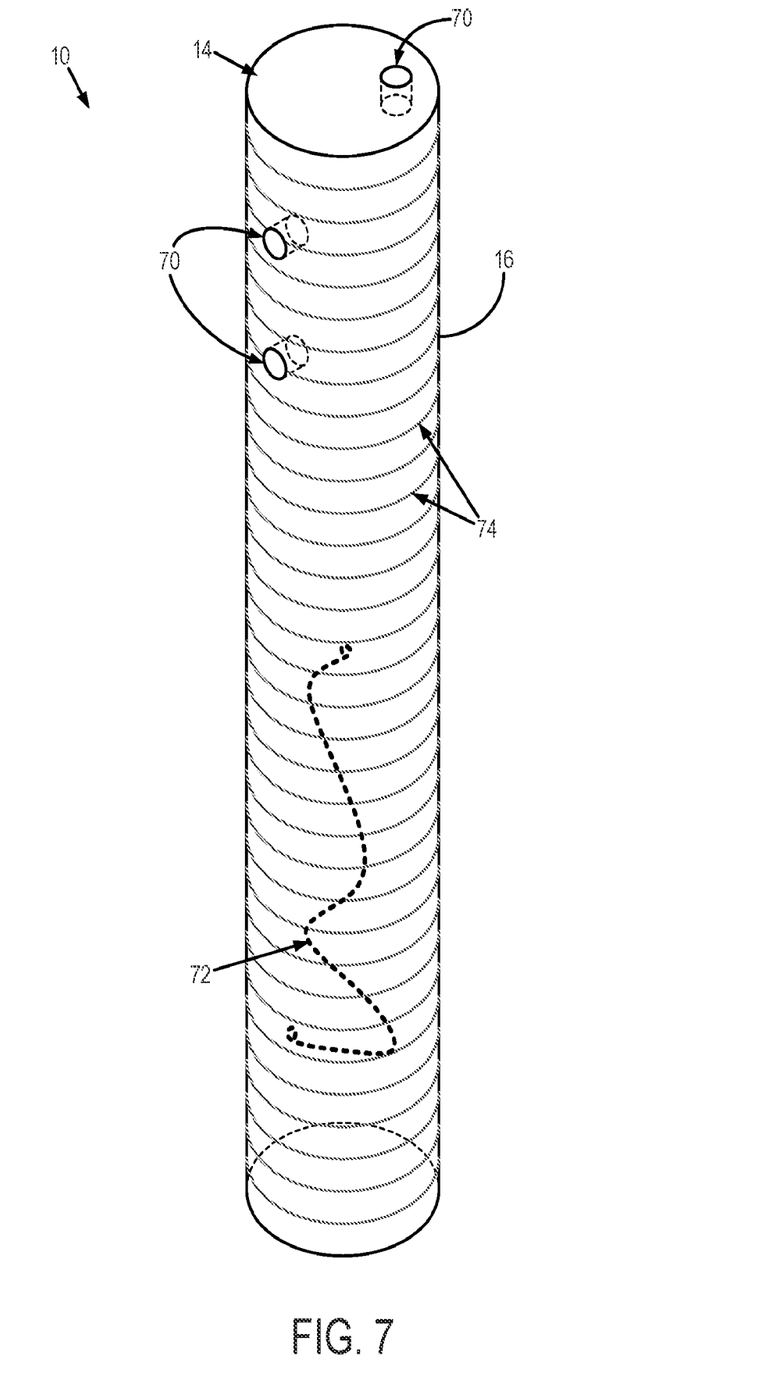
FIG. 7 shows an example of a marker constructed using an additive manufacturing process, such as 3D printing, in which one or more voids (e.g., pores, apertures, hollow tubes) are formed as features within the body of the marker.

As still another non-limiting example, the marker 10 can be manufactured using SLA or other 3D printing or additive manufacturing techniques in order to form the body 14 of the marker 10 as shown in FIG. 7. In this example, the features 12 that are constructed to generate twinkling artifacts can include pores 70 or other apertures formed in the outer surface 16 of the body 14 and/or contained within the inner volume of the body 14. The features 12 can also include one or more hollow tubes 72 that are formed within the body 14. The hollow tube(s) 72 may be formed to be contained completely within the inner volume of the body 14, or may extend to the outer surface 16 of the body 14, such that the hollow tube(s) 72 form an opening (e.g., an aperture) at the outer surface 16 of the body 14. The hollow tube(s) 72 may have a regular and/or uniform shape, or may have an arbitrary shape, such as shown in the example of FIG. 7. More generally, other forms of voids in the fill material used in the additive manufacturing process may also be used. The body 14 may also be constructed to have a rough texture on the outer surface 16, such as ridges 74, bumps, or other surface features. In the example shown in FIG. 7, the outer surface 16 has a coiled appearance formed by a series of regular ridges 74.

In some other instances, one or more features 12 may be formed in the body 14 of the marker 10. As one example, one or more features 12 may be formed in the body 14 by microetching or other such fabrication techniques. As another example, one or more features 12 may be formed in the body 14 by adding micro air bubbles (or other gas-filled bubbles) into a substrate that forms the body 14. As still another example, one or more features 12 may be formed in the body 14 by leaching pores into the body 14 of the marker. For instance, features 12 may be formed by leaching on cross-linked polydimethylsiloxane ("PDMS").

The outer surface 16 of the marker 10 can be smooth, or in some other implementations can be textured. In some implementations, the outer surface 16 of the marker 10 can be coated with one or more coatings.

To facilitate imaging of the marker 10 with imaging modalities other than ultrasound (e.g., x-ray, CT, MRI) as may be done in the routine treatment process, the marker 10 can be doped with a suitable contrast agent. As one example, the marker 10 can be composed of a non-metallic material that is doped with an x-ray contrast agent, such as barium sulfate or another radiopaque contrast agent. As another example, the marker 10 can be composed of a non-metallic material that is doped with gadolinium, iron oxide, or another paramagnetic contrast agent used in magnetic resonance imaging. As still another example, the marker 10 can be doped with a dye, such as a visible dye to color the marker or a fluorescent dye or quantum dots that can be imaged. As still another example, the outer surface 16 of the marker 10 can be coated, partially or completely, with one or more coatings that will enhance the appearance of the marker 10 in another imaging modality, such as x-ray, CT, or MRI. For instance, the marker 10 can be at least partially coated with a coating that will enhance the MRI signal of the marker 10. As non-limiting examples, the coating could include silicone-based signaling compounds, saline, vitamin E, and iron-based compounds, such as Feraheme and/or ferumoxytol, which demonstrates $T_1$ relaxation and can be used in varying doses as contrast for mapping of superficial lymphatic vessels in patients with extremity lymphedema.

Additionally or alternatively, the marker 10 can be constructed to serve as the foundation for additional signaling or as a source of therapeutic agents.

In some implementations, the marker 10 can be constructed such that it can be anchored within a tissue. In this way, the marker 10 can be made to remain adjacent a marked lesion even when that lesion shrinks over time as a result of treatment delivered to the lesion region. That is, the marker 10 can be anchored to a tissue so as to prevent or otherwise minimize migration of the marker 10.

As one non-limiting example, a material that causes a local inflammatory reaction can be coupled to the marker 10 such that when the marker 10 is implanted it will be anchored in position via mild soft-tissue matting. For instance, a polypropylene mesh material, such as PROLENE® (Johnson & Johnson Corporation; New Brunswick, New Jersey, United States) can be coupled to the marker 10 to achieve this effect. Only a small amount of mesh material can be used to induce such a reaction. The mesh material can be coupled to a single side surface) of the marker 10, or more than one side (or surface) of the marker 10.

As another non-limiting example, polydimethylsiloxane ("PDMS") can be used to reduce migration of the marker 10 when implanted. PDMS has a low chemical activity and is biologically inert, which is useful when it is used in implant devices. PDMS is made from a 3-component system involving a base, a curing agent, and a catalyst. The base is predominantly dimethylvinyl-terminated dimethylsiloxane. The curing agent is mostly composed of dimethylhydrogen siloxane. Both of these can be mixed with additives depending on the desired mechanical properties of the cured polymer. The third component is generally a metal-centered catalyst to promote crosslinking. For example, the metal-centered catalyst may be a platinum complex that promotes a hydrosilylation reaction between the methylhydrogen siloxane units in the curing agent and the terminal vinyl groups in the base siloxane.

An interesting property of cured PDMS is its ability of adhesion, hydrophobic properties, and low density compared to water and saline. In a semiaqueous environment (e.g., similar to human soft tissues), PDMS can make physical connections with solid surfaces. Based on these properties, the markers 10 can be coated on one or more surface with PDMS in order to achieve anchoring properties. In addition, PDMS exhibits ultrasound signaling features that are similar to free silicone; namely, a "snowstorm" appearance, which can be readily recognized during diagnostic ultrasound imaging. Based on this property, partially coating a marker 10 with PDMS can provide additional imaging characteristics.

Figure 8:
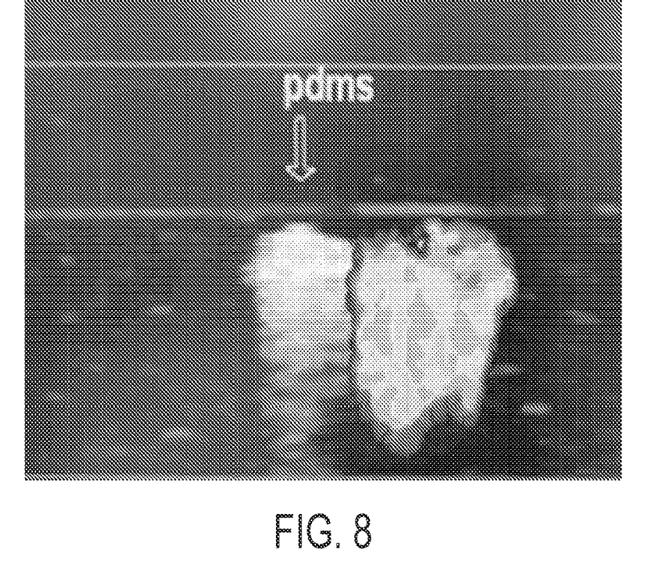
FIG. 8 is a Doppler ultrasound image of an example marker that is partially coated with PDMS, such that the PDMS coated part of the marker shows a "snowstorm" appearance and no twinkling, but the remainder of the marker maintains twinkling signature.

One example marker 10 was constructed as follows. The marker 10 was laser cut from a PMMA wafer and then partially coated with PDMS mixture and cured for 4 hours at 65 degrees Celsius. The sonographic appearance of this marker 10 demonstrated the classic "snowstorm appearance" of silicone as well as the twinkling signature described in the present disclosure, as shown in FIG. 8. It is contemplated that such a dual signaling (silicone and twinkling) marker 10 will not only afford greater sonographic detectability, but will also create a means by which migration of the marker will be minimized. In some configurations, a small amount of PDMS can be added as a concentric ring around the marker 10, such that a different number of PDMS rings could be used as a way to distinguish two markers 10 in relative close proximity to each other.

Further, in some implementations a plurality of markers 10 can be agglomerated, connected by filaments, or otherwise coupled together.

In some constructions, the marker 10 can be constructed to have one or more portions that can be turned to a certain frequency, such that when insonated by an ultrasound probe at that frequency those portions of the marker 10 can be reliably detected.

The examples described above include markers that are composed of non-metallic materials that are specifically composed to generate twinkling artifacts. In other examples, standard or otherwise existing markers, implants, medical instruments, or devices (e.g., biopsy markers, biopsy clips, fiducials, localizers) can be coated in a similar non-metallic material that is composed to generate twinkling artifacts.

In other examples, radioactive seeds, such as those used for brachytherapy treatments, can be coated with a similar non-metallic material that is composed to generate twinkling artifacts, which can facilitate the localization and accurate placement of these radioactive seeds. In addition to providing brachytherapy treatment, radiation seeds (e.g., I-125 seeds) can be used in preoperative localization to help guide a surgeon in the operating room. Currently, radioactive I-125 seed placements are capped (e.g., at 2 or 3) because surgeons are unable to precisely resolve the positions of radioactive seeds in the operating room when there are too many radioactive seeds in close proximity to each other. Using radioactive seeds coated with the materials described in the present disclosure can overcome this problem by enabling better localization of individual seed placement, even when more than 2 or 3 seeds are used. Moreover, the materials described in the present disclosure can serve as the localizers themselves, thereby obviating the need for preoperative radioactive seed localization.

In some implementations, in addition to forming features 12 in the body 14 of the marker 10, microspheres may be embedded in the body 14 to further enhance the twinkling signature generated by the marker 10. As one example, the microspheres could be titanium microspheres or other metallic microspheres. As another example, the microspheres could be poly(lactic-co-glycolic acid) ("PLGA") or other polymer or copolymer microspheres. In some embodiments, the marker 10 could be composed starting with such microspheres and forming the non-metallic substrate as a binder material.

Figure 9:
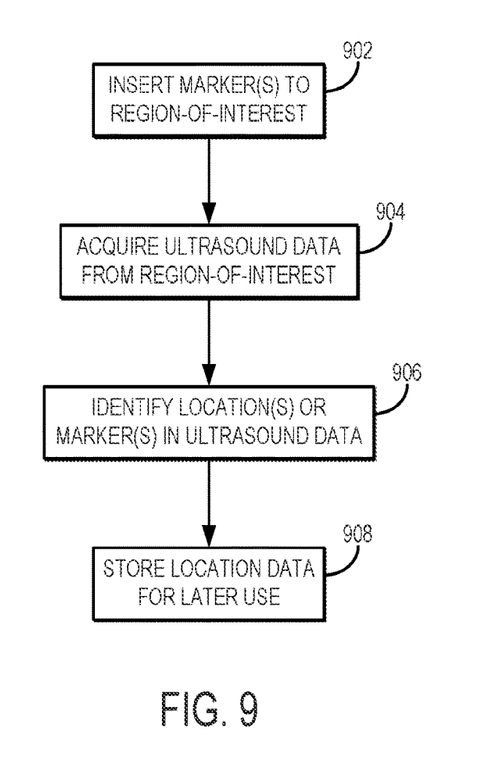
FIG. 9 is a flowchart setting forth the steps of an example method for locating or otherwise detecting non-metallic markers using ultrasound.

Having described example markers, a method for using such markers is now described. Referring to FIG. 9, a flowchart is illustrated as setting forth the steps of an example method for detecting a non-metallic marker using ultrasound. The method includes inserting one or more markers into a tissue region within a subject, as indicated at step 902. The markers may be inserted via injection using a needle or via deployment using a coaxial needle and inner stylet. As noted above, the needle may be an 18-gauge needle in some implementations.

When the one or more markers are in place, ultrasound data are acquired from a region-of-interest containing the markers, as indicated at step 904. In general, the ultrasound data are Doppler ultrasound data, such as color Doppler, power Doppler, or spectral Doppler ultrasound data. The ultrasound data may include, for instance, images that depict the region-of-interest. Because of the material composition of the markers, twinkling artifacts will be present in these images. The location of the one or more markers can then be detected by analyzing the images in the ultrasound data, as indicated at step 906. For instance, the twinkling artifacts can point to the location of the marker that is generating the twinkling artifact, thereby enabling localization of the marker.

In some non-limiting examples, the locations of the one or more markers can be detected by inputting the ultrasound data to a suitably trained machine learning algorithm, generating output as feature data or a feature map indicating the location of the one or more markers. In these instances, the machine learning algorithm can be trained to detect the twinkling artifacts. For instance, the machine learning algorithm could be trained on training data that includes labeled ultrasound images that indicate the presence and location of twinkling artifacts. The machine learning algorithm may be an artificial neural network, such as a convolution neural network. In some implementations, the machine learning algorithm may implement deep learning. Using this suitably trained machine learning algorithm can enable automatic, real-time detection and localization of multiple different markers.

The locations of the markers can be recorded and stored for later use, as indicated at step 908. In some implementations, the locations of the markers can be stored and used to generate a display element that indicates the location or otherwise depicts of each marker. These display elements can then be generated on a display for a user to visualize the location of the markers within the imaged region-of-interest. In some other implementations, the locations of the markers can be stored and coregistered with other medical images (e.g., x-ray images, CT images, magnetic resonance images) in order to visualize the markers on those other medical images.

In still other implementations, the locations of the markers can be stored and converted into coordinate data for use with a surgical navigation system or a guided radiation therapy system. In this way, the coordinate data associated with the locations of the markers as determined from the ultrasound images of those markers can be used to guide accurate delivery of treatment to the subject.

The readily identifiable twinkling signature on color flow imaging associated with the markers described in the present disclosure can be translated into an apparent acoustic signature. For instance, the twinkling signature can be translated into an acoustic signature by using a pulsed Doppler gate, or by using other suitable image processing techniques to detect twinkling present in the color flow imaging region-of-interest ("ROI").

Advantageously, using this technique the twinkling signature's variability in time and space can be used to sensitively and specifically identify the marker and avoid false positive signals. In some implementations, the acoustic gate can also be modulated to explore various depths and detect the twinkling sound. Digital signal processing algorithms and techniques can also be implemented to reflect a continuous readout to the user of the distance from the probe to the twinkling source. This can enable the user to accurately locate the marker in real-time based on the acoustic feedback provided by the twinkling signature. In a similar fashion, haptic feedback can be generated and provided to the user to help indicate the location of the marker 10. The acoustic signature can be used as a broadband sound from the ultrasound machine or a tone could be used and the tone could be modulated in amplitude or repetition to indicate proximity of the ultrasound transducer to the marker.

Color flow imaging (CFI) or power Doppler (PD) both use pulsed Doppler techniques to measure blood flow velocity. The twinkling signatures described in the present disclosure have high spatial and temporal variability of the velocity map produced by the CFI or PD modes. This spatiotemporal variation can be utilized to identify regions in an image exhibiting such twinkling signatures, which can be used for localization, for generating acoustic feedback, and/or for generating haptic feedback related to a localized marker.

On a pixel-by-pixel basis, a window of $N_t$ frames can be isolated and the variance, $V_t$, can be calculated using the equations below.

$$V_t(x, y, n) = \frac{1}{N_t - 1} \sum_{i=n-(N_t-1)/2}^{n+(N_t-1)/2} |I(x, y, i) - \mu|^2; \quad (1)$$

-continued $$\mu = \frac{1}{N_t} \sum_{i=n-(N_t-1)/2}^{n+(N_t-1)/2} I(x, y, i). \quad (2)$$

In this formulation the value of $N_t$ is odd. The variance value for the $N_t$ frames will replace the pixel value for the middle of the window.

On a frame-by-frame basis, a moving two-dimensional (2D) window of $N_s \times N_s$ pixels can be isolated and a variance, $V_s$, can be calculated. In the formulation below, $N_s$ is odd.

$$V_s(x, y, n) = \frac{1}{N_s^2 - 1} \sum_{i=x-(N_s-1)/2}^{x+(N_s-1)/2} \sum_{j=y-(N_s-1)/2}^{y+(N_s-1)/2} |I(i, j, n) - \mu|^2; \quad (3)$$

$$\mu = \frac{1}{N_s} \sum_{i=x-(N_s-1)/2}^{x+(N_s-1)/2} \sum_{j=y-(N_s-1)/2}^{y+(N_s-1)/2} I(i, j, n). \quad (4)$$

The variance value for the 2D window will replace the value for the middle pixel of the window at (x,y).

On a pixel-by-pixel and frame-by-frame basis the temporal and spatial variance, $V_{ts}$, can be combined in some way either by sum or product. An example combined metric can be provided by:

$$V_{ts}(x,y,n) = V_t(x,y,n) V_s(x,y,n) \quad (5).$$

After the different metrics are evaluated, a threshold can be determined for masking pixels in an ultrasound cine clip to show where the metric has determined the presence of twinkling.

It is contemplated that the temporal variance is the most sensitive; however, the combination of spatial and temporal variance can improve specificity of the metric to eliminate noise and/or false positives.

Figure 10:
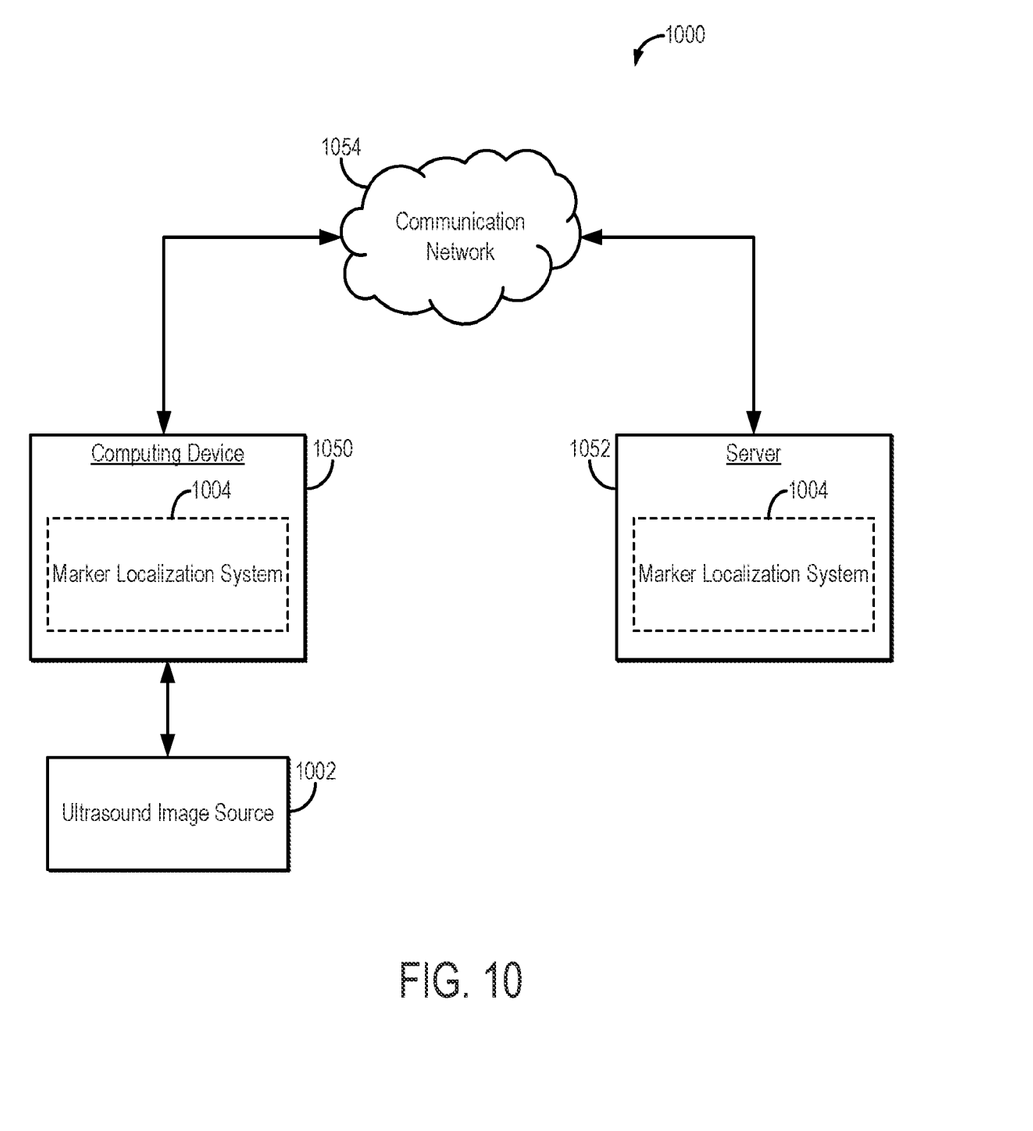
FIG. 10 is a block diagram of an example marker localization system.

Referring now to FIG. 10, an example of a system 1000 for detecting or otherwise locating a marker (e.g., a treatment site marker, a biopsy site marker) in accordance with some embodiments of the systems and methods described in the present disclosure is shown. As shown in FIG. 10, a computing device 1050 can receive one or more types of data (e.g., ultrasound data) from ultrasound image source 1002. In some embodiments, computing device 1050 can execute at least a portion of a marker localization system 1004 to locate one or more markers from data received from the ultrasound image source 1002.

Additionally or alternatively, in some embodiments, the computing device 1050 can communicate information about data received from the ultrasound image source 1002 to a server 1052 over a communication network 1054, which can execute at least a portion of the marker localization system 1004. In such embodiments, the server 1052 can return information to the computing device 1050 (and/or any other suitable computing device) indicative of an output of the marker localization system 1004.

In some embodiments, computing device 1050 and/or server 1052 can be any suitable computing device or combination of devices, such as a desktop computer, a laptop computer, a smartphone, a tablet computer, a wearable computer, a server computer, a virtual machine being executed by a physical computing device, and so on. The computing device 1050 and/or server 1052 can also reconstruct images from the data.

In some embodiments, ultrasound image source 1002 can be any suitable source of image data (e.g., measurement data, images reconstructed from measurement data), such as an ultrasound system, another computing device (e.g., a server storing image data), and so on. In some embodiments, ultrasound image source 1002 can be local to computing device 1050. For example, ultrasound image source 1002 can be incorporated with computing device 1050 (e.g., computing device 1050 can be configured as part of a device for capturing, scanning, and/or storing images). As another example, ultrasound image source 1002 can be connected to computing device 1050 by a cable, a direct wireless link, and so on. Additionally or alternatively, in some embodiments, ultrasound image source 1002 can be located locally and/or remotely from computing device 1050, and can communicate data to computing device 1050 (and/or server 1052) via a communication network (e.g., communication network 1054).

In some embodiments, communication network 1054 can be any suitable communication network or combination of communication networks. For example, communication network 1054 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 108 can be a local area network, a wide area network, a public network (e.g., the Internet), a private or semi-private network (e.g., a corporate or university intranet), any other suitable type of network, or any suitable combination of networks. Communications links shown in FIG. 10 can each be any suitable communications link or combination of communications links, such as wired links, fiber optic links, Wi-Fi links, Bluetooth links, cellular links, and so on.

Figure 11:
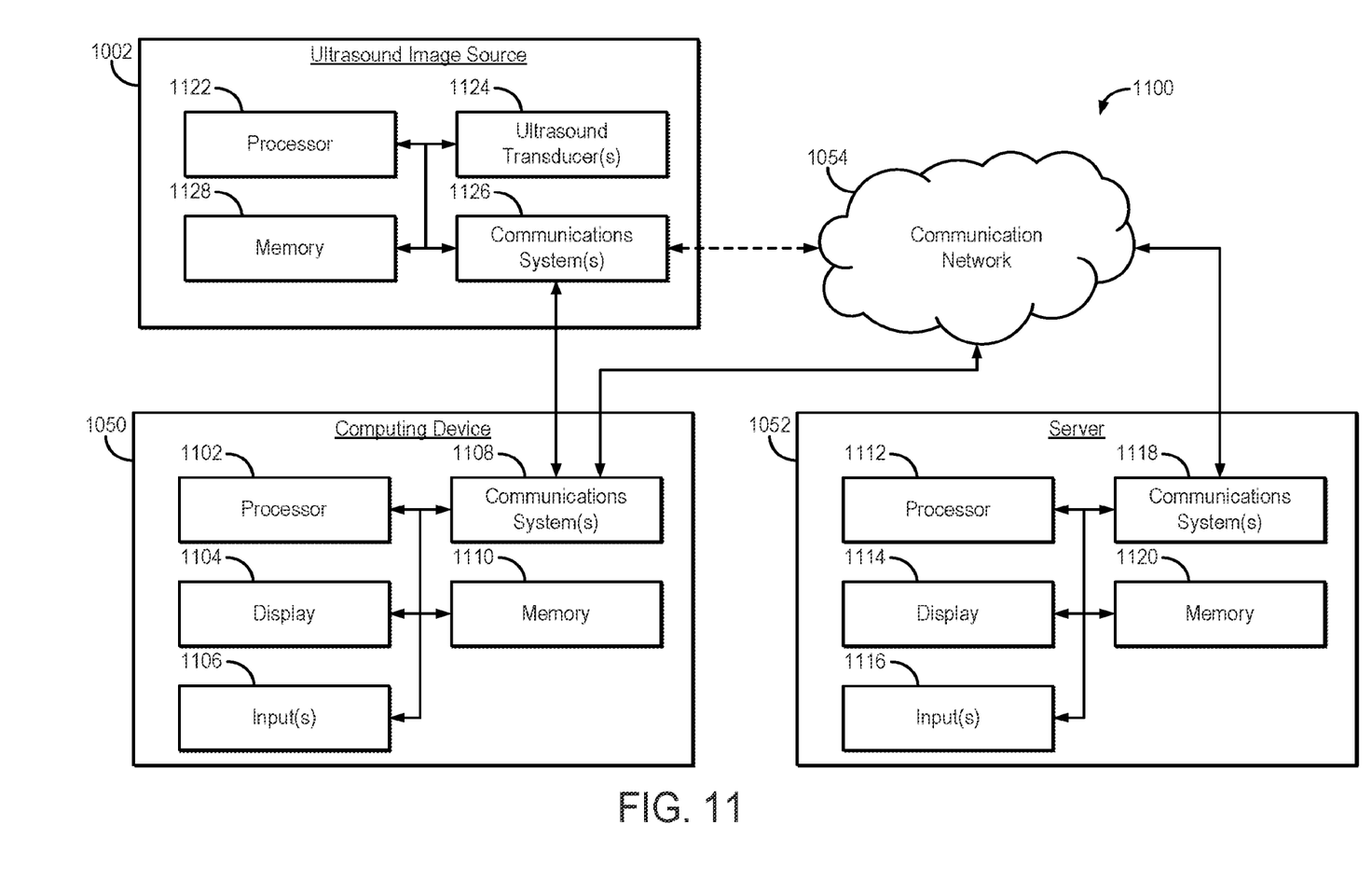
FIG. 11 is a block diagram of example components that can implement the marker localization system of FIG. 10.

Referring now to FIG. 11, an example of hardware 1100 that can be used to implement ultrasound image source 1002, computing device 1050, and server 1054 in accordance with some embodiments of the systems and methods described in the present disclosure is shown. As shown in FIG. 11, in some embodiments, computing device 1050 can include a processor 1102, a display 1104, one or more inputs 1106, one or more communication systems 1108, and/or memory 1110. In some embodiments, processor 1102 can be any suitable hardware processor or combination of processors, such as a central processing unit ("CPU"), a graphics processing unit ("GPU"), and so on. In some embodiments, display 1104 can include any suitable display devices, such as a computer monitor, a touchscreen, a television, and so on. In some embodiments, inputs 1106 can include any suitable input devices and/or sensors that can be used to receive user input, such as a keyboard, a mouse, a touchscreen, a microphone, and so on.

In some embodiments, communications systems 1108 can include army suitable hardware, firmware, and/or software for communicating information over communication network 1054 and/or any other suitable communication networks. For example, communications systems 1108 can include one or more transceivers, one or more communication chips and/or chip sets, and so on. In a more particular example, communications systems 1108 can include hardware, firmware and/or software that can be used to establish a Wi-Fi connection, a Bluetooth connection, a cellular connection, an Ethernet connection, and so on.

In some embodiments, memory 1110 can include any suitable storage device or devices that can be used to store instructions, values, data, or the like, that can be used, for example, by processor 1102 to present content using display 1104, to communicate with server 1052 via communications system(s) 1108, and so on. Memory 1110 can include any suitable volatile memory, non-volatile memory, storage, or any suitable combination thereof. For example, memory 1110 can include RAM, ROM, EEPROM, one or more flash drives, one or more hard disks, one or more solid state drives, one or more optical drives, and so on. In some embodiments, memory 1110 can have encoded thereon, or otherwise stored therein, a computer program for controlling operation of computing device 1050. In such embodiments, processor 1102 can execute at least a portion of the computer program to present content (e.g., images, user interfaces, graphics, tables), receive content from server 1052, transmit information to server 1052, and so on.

In some embodiments, server 1052 can include a processor 1112, a display 1114, one or more inputs 1116, one or more communications systems 1118, and/or memory 1120. In some embodiments, processor 1112 can be any suitable hardware processor or combination of processors, such as a CPU, a GPU, and so on. In some embodiments, display 1114 can include any suitable display devices, such as a computer monitor, a touchscreen, a television, and so on. In some embodiments, inputs 1116 can include any suitable input devices and/or sensors that can be used to receive user input, such as a keyboard, a mouse, a touchscreen, a microphone, and so on.

In some embodiments, communications systems 1118 can include any suitable hardware, firmware, and/or software for communicating information over communication network 1054 and/or any other suitable communication networks. For example, communications systems 1118 can include one or more transceivers, one or more communication chips and/or chip sets, and so on. In a more particular example, communications systems 1118 can include hardware, firmware and/or software that can be used to establish a Wi-Fi connection, a Bluetooth connection, a cellular connection, an Ethernet connection, and so on.

In some embodiments, memory 1120 can include any suitable storage device or devices that can be used to store instructions, values, data, or the like, that can be used, for example, by processor 1112 to present content using display 1114, to communicate with one or more computing devices 1050, and so on. Memory 1120 can include any suitable volatile memory, non-volatile memory, storage, or any suitable combination thereof. For example, memory 1120 can include RAM, ROM, EEPROM, one or more flash drives, one or more hard disks, one or more solid state drives, one or more optical drives, and so on. In some embodiments, memory 1120 can have encoded thereon a server program for controlling operation of server 1052. In such embodiments, processor 1112 can execute at least a portion of the server program to transmit information and/or content (e.g., data, images, a user interface) to one or more computing devices 1050, receive information and/or content from one or more computing devices 1050, receive instructions from one or more devices (e.g., a personal computer, a laptop computer, a tablet computer, a smartphone), and so on.

In some embodiments, ultrasound image source 1002 can include a processor 1122, one or more ultrasound transducers 1124, one or more communications systems 1126, and/or memory 1128. In some embodiments, processor 1122 can be any suitable hardware processor or combination of processors, such as a CPU, a GPU, and so on. In some embodiments, the one or more ultrasound transducers 1124 are generally configured to acquire data, images, or both. Additionally or alternatively, in some embodiments, one or more ultrasound transducers 1124 can include any suitable hardware, firmware, and/or software for coupling to and/or controlling operations of an ultrasound transducer. In some embodiments, one or more portions of the one or more ultrasound transducers 1124 can be removable and/or replaceable.

Note that, although not shown, ultrasound image source 1002 can include any suitable inputs and/or outputs. For example, ultrasound image source 1002 can include input devices and/or sensors that can be used to receive user input, such as a keyboard, a mouse, a touchscreen, a microphone, a trackpad, a trackball, and so on. As another example, ultrasound image source 1002 can include any suitable display devices, such as a computer monitor, a touchscreen, a television, etc., one or more speakers, and so on. For instance, as described above, in some embodiments an acoustic signature can be generated based on a measured twinkling signature of a marker. This acoustic signature can be used to generate an auditory cue (e.g., a sound) that is output to the user and indicates a localization of a marker. Additionally or alternatively, the output may be haptic feedback provided to the user that indicates a proximity to a localized marker.

In some embodiments, communications systems 1126 can include any suitable hardware, firmware, and/or software for communicating information to computing device 1050 (and, in some embodiments, over communication network 1054 and/or any other suitable communication networks). For example, communications systems 1126 can include one or more transceivers, one or more communication chips and/or chip sets, and so on. In a more particular example, communications systems 1126 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1128 can include any suitable storage device or devices that can be used to store instructions, values, data, or the like, that can be used, for example, by processor 1122 to control the one or more ultrasound transducers 1124, and/or receive data from the one or more ultrasound transducers 1124; to images from data; present content (e.g., images, a user interface) using a display; communicate with one or more computing devices 1050; and so on. Memory 1128 can include any suitable volatile memory, non-volatile memory, storage, or any suitable combination thereof. For example, memory 1128 can include RAM, ROM, EEPROM, one or more flash drives, one or more hard disks, one or more solid state drives, one or more optical drives, and so on. In some embodiments, memory 1128 can have encoded thereon, or otherwise stored therein, a program for controlling operation of ultrasound image source 1002. In such embodiments, processor 1122 can execute at least a portion of the program to generate images, transmit information and/or content (e.g., data, images) to one or more computing devices 1050, receive information and/or content from one or more computing devices 1050, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

Figure 12:
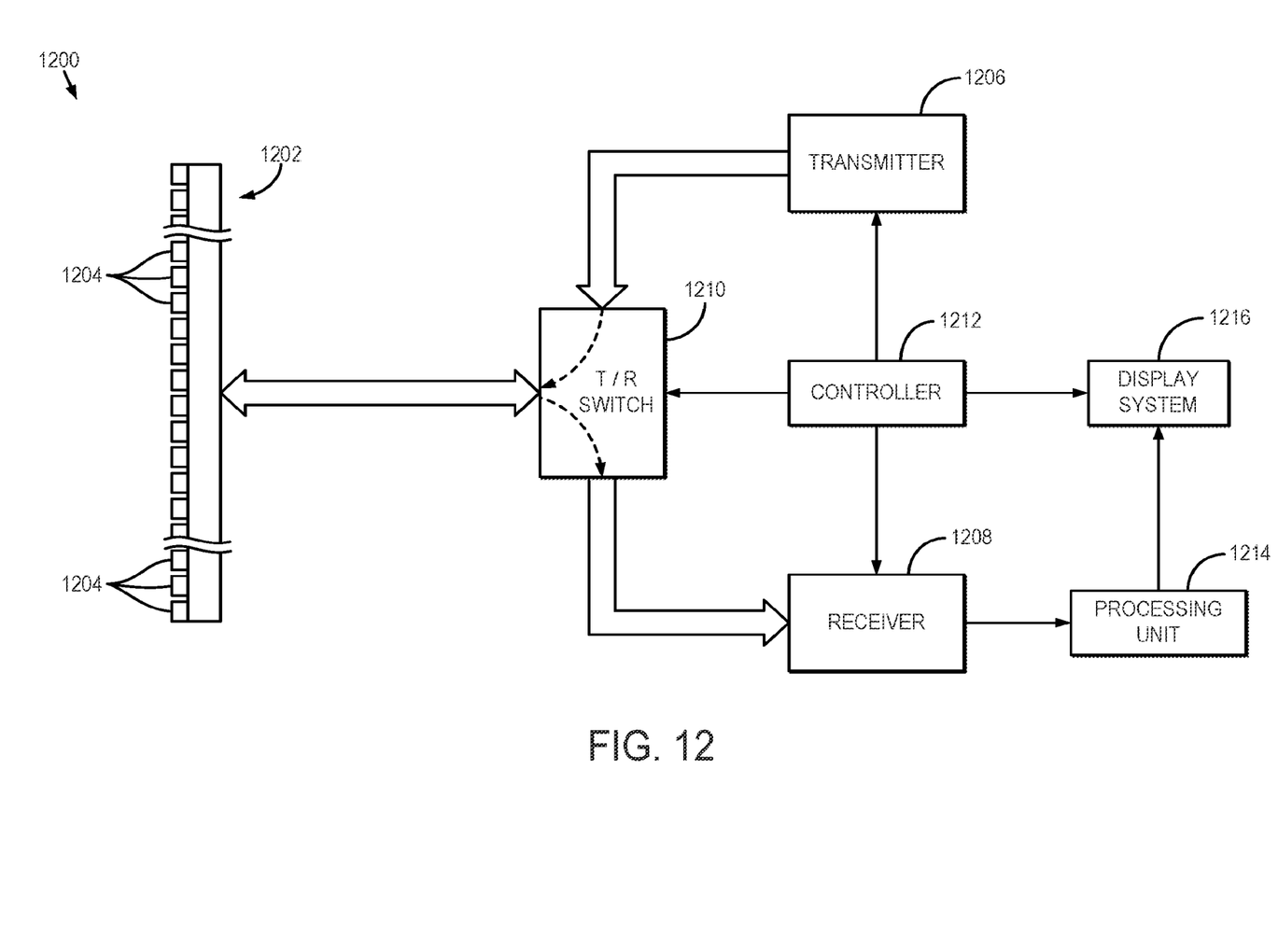
FIG. 12 is an example ultrasound system that can be used to detect the non-metallic markers described in the present disclosure.

FIG. 12 illustrates an example of an ultrasound system 1200 that can implement the methods described in the present disclosure. The ultrasound system 1200 includes a transducer array 1202 that includes a plurality of separately driven transducer elements 1204. The transducer array 1202 can include any suitable ultrasound transducer array, including linear arrays, curved arrays, phased arrays, and so on. Similarly, the transducer array 1202 can include a 1D transducer, a 1.5D transducer, a 1.75D transducer, a 2D transducer, a 3D transducer, and so on.

When energized by a transmitter 1206, a given transducer element 1204 produces a burst of ultrasonic energy. The ultrasonic energy reflected back to the transducer array 1202 (e.g., an echo) from the object or subject under study is converted to an electrical signal (e.g., an echo signal) by each transducer element 1204 and can be applied separately to a receiver 1208 through a set of switches 1210. The transmitter 1206, receiver 1208, and switches 1210 are operated under the control of a controller 1212, which may include one or more processors. As one example, the controller 1212 can include a computer system.

The transmitter 1206 can be programmed to transmit unfocused or focused ultrasound waves. In some configurations, the transmitter 1206 can also be programmed to transmit diverged waves, spherical waves, cylindrical waves, plane waves, or combinations thereof. Furthermore, the transmitter 1206 can be programmed to transmit spatially or temporally encoded pulses.

The receiver 1208 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 1206 and the receiver 1208 can be programmed to implement a high frame rate. For instance, a frame rate associated with an acquisition pulse repetition frequency ("PRF") of at least 100 Hz can be implemented. In some configurations, the ultrasound system 1200 can sample and store at least one hundred ensembles of echo signals in the temporal direction.

The controller 1212 can be programmed to select and implement an imaging sequence for acquiring ultrasound data. The controller 1212 can also be programmed to control various parameters of the ultrasound system 1200 in order to optimize the visualization of the non-metallic markers described in the present disclosure. For instance, the controller 1212 can be programmed to adjust the color gain, color-write priority, color Doppler frequency, color focus, wall filter, pulse repetition frequency, and other suitable parameters.

A scan can be performed by setting the switches 1210 to their transmit position, thereby directing the transmitter 1206 to be turned on momentarily to energize transducer elements 1204 during a single transmission event according to the selected imaging sequence. The switches 1210 can then be set to their receive position and the subsequent echo signals produced by the transducer elements 1204 in response to one or more detected echoes are measured and applied to the receiver 1208. The separate echo signals from the transducer elements 1204 can be combined in the receiver 1208 to produce a single echo signal.

The echo signals are communicated to a processing unit 1214, which may be implemented by a hardware processor and memory, to process echo signals or images generated from echo signals. As an example, the processing unit 1214 can generate images that depict twinkling artifacts caused by the non-metallic markers described in the present disclosure. Images produced from the echo signals by the processing unit 1211 can be displayed on a display system 1216.

The present disclosure has described one or more preferred embodiments, and it should be appreciated that many equivalents, alternatives, variations, and modifications, aside from those expressly stated, are possible and within the scope of the invention.

The invention claimed is:

1. An ultrasound-detectable marker, comprising:
a body formed of a non-metallic material using an additive manufacturing process, wherein the body has formed therein a plurality of features that when imaged using Doppler ultrasound will generate a twinkling artifact, the plurality of features comprising physical deformations formed in the body by the additive manufacturing process and a surface texture formed in a surface of the body using the additive manufacturing process.

2. The ultrasound-detectable marker of claim 1, wherein the non-metallic material is polymethyl methacrylate (PMMA).

3. The ultrasound-detectable marker of claim 1, further comprising a polypropylene mesh coupled to at least one surface of the non-metallic material.

4. The ultrasound-detectable marker of claim 1, wherein the features are microetched features formed on a surface of the non-metallic material.

5. The ultrasound-detectable marker of claim 1, wherein a portion of the non-metallic material is constructed to be tuned to a particular frequency such that when insonated with ultrasound at that frequency the portion of the marker generates a discernable twinkling signature.

6. The ultrasound-detectable marker of claim 1, wherein the body is formed into a shape comprising one of a cylindrical shape, a rectangular shape, a spherical shape, an ellipsoidal shape, a spiral shape, a coiled shape, a threaded shape, or a helical shape.

7. The ultrasound-detectable marker of claim 1, wherein the features comprise the physical deformations in the non-metallic material, wherein the physical deformations comprise pores that are formed in the non-metallic material.

8. The ultrasound-detectable marker of claim 7, wherein the pores are sized to have a diameter between 1 µm and 1 mm.

9. The ultrasound-detectable marker of claim 8, wherein the pores are sized to have a diameter between 1 µm and 80 µm.

10. The ultrasound-detectable marker of claim 8, wherein the pores are sized to have a diameter between 0.5 mm and 1 mm.

11. The ultrasound-detectable marker of claim 1, further comprising a polydimethylsiloxane (PDMS) coating partially applied to at least one surface of the non-metallic material.

12. The ultrasound-detectable marker of claim 11, wherein the PDMS coating is applied circumferentially around an outer surface of the non-metallic marker so as to form a PDMS ring on the outer surface of the non-metallic marker.

13. The ultrasound-detectable marker of claim 1, wherein the features comprise the physical deformations in the non-metallic material, wherein the physical deformations comprise voids where non-metallic material is not deposited.

14. The ultrasound-detectable marker of claim 13, wherein the voids where non-metallic material is not deposited comprise pores.

15. The ultrasound-detectable marker of claim 13, wherein the voids where non-metallic material is not deposited comprise one or more hollow tubes.

16. The ultrasound-detectable marker of claim 13, wherein the voids where non-metallic material is not deposited comprise a combination of pores and one or more hollow tubes.

17. A method for localizing an ultrasound-detectable marker, the method comprising:
 (a) obtaining Doppler ultrasound data from a region-of-interest (ROI) containing a marker that when insonated with ultrasound generates a twinkling artifact signature;
 (b) computing a spatiotemporal variation of the twinkling artifact signature in the Doppler ultrasound data; and
 (c) localizing the marker in the ROI based on the spatiotemporal variation of the twinkling artifact signature.

18. The method of claim 17, further comprising generating an auditory output to a user based on localizing the marker.

19. The method of claim 17, further comprising generating a haptic feedback signal for a user based on localizing the marker.

20. An ultrasound-detectable marker, comprising:
 a non-metallic material having formed therein a plurality of features that are sized and shaped that when imaged using Doppler ultrasound will generate a twinkling artifact;
 a polydimethylsiloxane (PDMS) coating partially applied to at least one surface of the non-metallic material; and
 wherein the PDMS coating is applied circumferentially around an outer surface of the non-metallic marker so as to form a PDMS ring on the outer surface of the non-metallic marker.

\* \* \* \* \*

UNITED STATES PATENT AND TRADEMARK OFFICE
CERTIFICATE OF CORRECTION

| | | |
|---|---|---|
| PATENT NO. | : 12,478,347 B2 | Page 1 of 1 |
| APPLICATION NO. | : 17/762018 | |
| DATED | : November 25, 2025 | |
| INVENTOR(S) | : Christine U. Lee et al. | |

It is certified that error appears in the above-identified patent and that said Letters Patent is hereby corrected as shown below:

In the Specification

Column 6, Line 8, "side surface)" should be --side (or surface)--.

Column 10, Line 53, "army" should be --any--.

Column 14, Line 14, "1211" should be --1214--.

Signed and Sealed this
Twentieth Day of January, 2026

John A. Squires
*Director of the United States Patent and Trademark Office*